E. A. GRAHAM, W. J. RICKETS & E. A. SANFTLEBEN.
TELEPHONIC SYSTEM.
APPLICATION FILED MAY 29, 1914.

1,186,305.

Patented June 6, 1916.
6 SHEETS—SHEET 1.

Fig.1.

Witnesses:
E. R. Peck
Allen E. Peck

Inventors:
E. A. Graham
W. J. Rickets
E. A. Sanftleben
by Hubert Peck
atty.

E. A. GRAHAM, W. J. RICKETS & E. A. SANFTLEBEN.
TELEPHONIC SYSTEM.
APPLICATION FILED MAY 29, 1914.

1,186,305.

Patented June 6, 1916.
6 SHEETS—SHEET 5.

E. A. GRAHAM, W. J. RICKETS & E. A. SANFTLEBEN.
TELEPHONIC SYSTEM.
APPLICATION FILED MAY 29, 1914.

1,186,305.

Patented June 6, 1916.
6 SHEETS—SHEET 6.

UNITED STATES PATENT OFFICE.

EDWARD ALFRED GRAHAM, WILLIAM JOHN RICKETS, AND ERNEST ALBERT SANFTLEBEN, OF BROCKLEY, LONDON, ENGLAND.

TELEPHONIC SYSTEM.

1,186,305.  Specification of Letters Patent.  Patented June 6, 1916.

Application filed May 29, 1914. Serial No. 841,774.

*To all whom it may concern:*

Be it known that we, EDWARD ALFRED GRAHAM, WILLIAM JOHN RICKETS, and ERNEST ALBERT SANFTLEBEN, subjects of the King of Great Britain and Ireland, residing at Brockley, in the county of London, England, have invented Improvements in or Relating to Telephonic Systems, of which the following is a specification.

This invention relates to three wire telephonic systems of the kind wherein the transmitter at one station is arranged to be connected in series with an inductance coil or the like and in parallel with the telephonic receiver windings which are in series with a condenser at another station and the transmitter at the latter station is likewise connected in series with an inductance coil or the like and in parallel with the telephonic receiver windings which are in series with a condenser at the first station, the return connection for such parallel circuits being common.

In the present application no claim is made for the particular arrangement or connection of telephonic transmitters, receivers and inductances involved in the "speaking" circuit above referred to, such arrangement or connection being that well known and understood as the common battery or central energy system which principle is extensively applied to two wire telephonic connections. Circuits in which three conductors are employed are an obvious modification thereof and reference may be made to the German specifications of Mix and Genest's German Patents Nos. 152372 of 1904 and 159780 of 1905 as showing such circuit modifications.

Objects of the present invention are to provide three wire telephonic systems having relay arrangements by which voice calls and other audible signals, or visual signals, can be selectively obtained and, at the same time, systems whereby the telephonic receivers can have electromagnets in place of the permanent magnets usually employed, the windings of the said electro-magnets being connected across the lines between the stations in such a manner as to take current from the system only when the same is in actual use. For these purposes, respectively a polarized relay or a non-polarized relay in series with an electrolytic valve cell and change over switches are inserted in the circuit. The energizing winding of the relay may be used to form the energizing winding of the receiver magnet, or the winding of the relay may be arranged in series or in parallel with the energizing winding of the receiver magnet. A non-polarized relay by itself would not fulfil the purposes of this invention for such a relay upon being operated from the distant station would, under the conditions mentioned herein, remain closed as long as the supply to the system might be maintained, assuming that the circuit were not broken by answering the call. The polarized relay responds to current in one direction thereby closing a local circuit and upon receiving current in the opposite direction, breaks this circuit, in some cases closing however an alternative local circuit if such reverse current be maintained. The non-polarized relay in series with an electrolytic valve cell responds to a current in one direction only, this result being obtained by virtue of the said electrolytic valve cell. These relays as regards one application of the invention are so disposed in the telephonic system that a voice call can be mutually given between stations without operation of either relay although alternatively the relays can also be actuated and made to close the circuits of audible or visual signals at the called stations. At the same time the current flowing through the relay may polarize the magnet of the allied telephonic receiver. Calls may be given by bell only, or by voice call together with a lamp signal, or by vibrator interrupter call together with a lamp or other visual signal. Supervision of the audible signal given at the distant station is obtained at the station originating the call.

When stations working on the system according to this invention are connected to a central exchange switch-board, then upon originating a call to the central exchange from the distant station, current is taken through the inductance connected to that station which inductance, serving also as a relay closes two local circuits, one through an individual signal lamp and the other through the exchange bell. Alternatively, a voice call only may be given to the exchange calling receiver. The exchange operator when wishing to communicate with an out-station, connects the operator's instrument directly to the out-station, whereupon the telephones become connected and function as for direct communication. Similarly, when two out-stations communicate, the connections are as for a plain circuit.

The present invention is to be distinguished from that of the copending application No. 828552 in the name of E. A. Graham, by the fact that relays are so associated with three wires as to enable selective calls to be given without there being any closed circuit existent when the system is not in use by which leakage of current could take place, whereas the same problem in the companion case referred to is solved by employing a fourth wire and relays that are not affected by changes in polarity of current as in the arrangements now about to be described, in all of which two of the wires are normally at the same potential, being connected to one pole of a source of supply through like inductance coils so that until the potential of either of such wires is lowered by switch mechanism connecting it to the third wire, the relay windings take no current.

In the accompanying drawings Figures 1, 2, 3, 4 and 4ᵃ illustrate diagrammatically different ways of arranging the relays and the circuits for operating the same.

Figure 1:
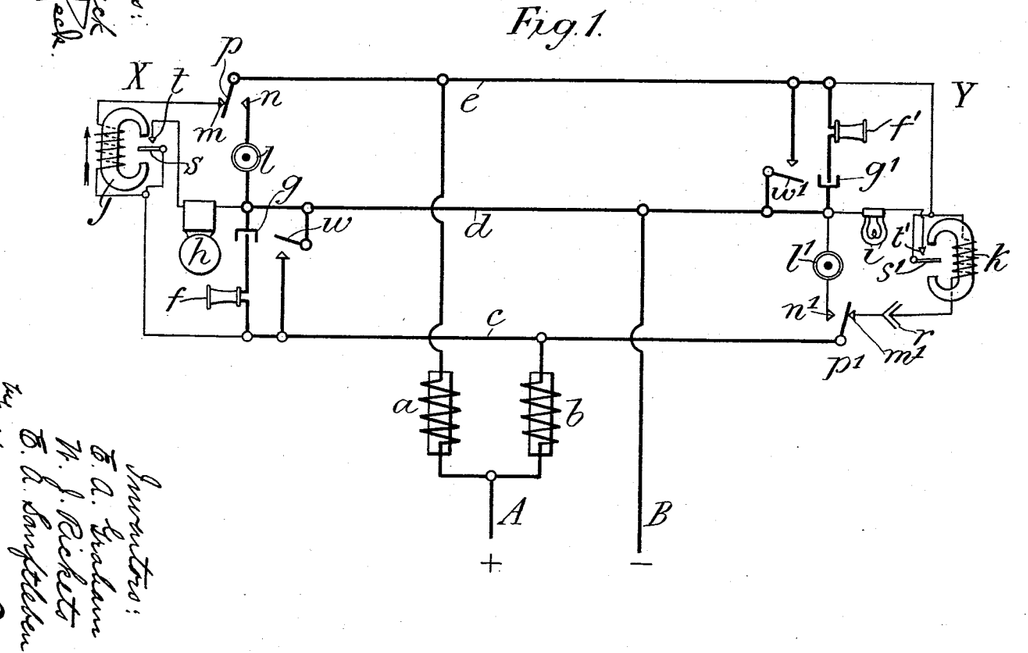

Referring to Fig. 1, $a$ and $b$ are inductances; $c$, $d$ and $e$ are lines connecting together stations X and Y; $f$ and $f^1$ are receivers, $g$ and $g^1$ are condensers, $h$ is a bell, $i$ a signal lamp, $j$ a polarized relay; $k$ a non-polarized relay; $l$ and $l^1$ transmitters, $m$ and $m^1$ normal contacts and $n$ and $n^1$ alternative contacts of switch arms $p$ and $p^1$ respectively, $r$ is an electrolytic valve cell; $s$ and $s^1$ are relay armatures; $t$ and $t^1$ are relay contacts and $w$ and $w^1$ push switches. The lamp $i$ may if desired, be replaced by a bell. In this arrangement when station X desires to call station Y by lamp (or bell) signal, push switch $w$ is closed and current flows by one path from the positive supply lead A through the inductance $b$ to line $c$ and thence to the negative supply lead B through push switch $w$ and line $d$ and by another path through inductance $a$ to line $e$, non-polarized relay $k$, electrolytic valve cell $r$, contact $m^1$, switch arm $p^1$, line $c$ and thence through push switch $w$ to the negative supply lead B. As the electrolytic valve cell $r$ allows current to pass in the direction traced, the relay $k$ then attracts its armature $s^1$ and closes the circuit of the signal lamp $i$ at contact $t^1$ giving the calling signal. Upon breaking the circuit at push switch $w$ the relay $k$ releases the armature $s^1$ thus breaking the circuit of the signal lamp $i$. The electrolytic valve call $r$ prevents a reverse flow of current through inductance $b$, line $c$, relay $k$, armature $s^1$ and signal lamp $i$ to negative at the moment when the relay $k$ is closed and push switch $w$ opened, which flow of current, if allowed to be established, would retain the non-polarized relay $k$ continually closed. Also when station Y completes the circuit of the transmitter $l^1$ in order to reply, the circuit of the relay $k$ is broken at contact $m$ thus avoiding the continuation of the visual or audible signal during conversation. When station X calls station Y by voice, the circuit of transmitter $l$ is closed at contact $n$ and a voice call is then given, the telephonic circuit being now in accordance with the connections for conversation required at one station when employing a telephonic system of the kind herein referred to. Upon giving a voice call from station X to station Y the non-polarized relay $k$ will not be actuated, because although line $e$ is connected to the negative supply lead B through the transmitter $l$ current to actuate the non-polarized relay $k$ would be required to flow through the inductance $b$ and line $c$ to the relay $k$ and thence to line $e$ and the negative supply lead B but such flow of current is prevented by the electrolytic valve cell $r$ placed in opposition in the circuit of relay $k$. The calls from station Y to station X may be followed in detail in a similar manner, the polarized relay $j$, in the example, closing the circuit of the bell $h$ at contact $t$ when current is received in the direction of the arrow and breaking this circuit when current is received in the opposite direction. The relay $j$ is operated when push switch $w^1$ is closed, current then flowing direct thereto by way of inductance $b$ and line $c$, but the contacts are not closed when, alternatively, the circuit of transmitter $l^1$ at station Y is made for giving a voice call. Full control of the distant relay is thus obtained from either station and indicator signals, or voice calls can be given at will.

Figure 2:
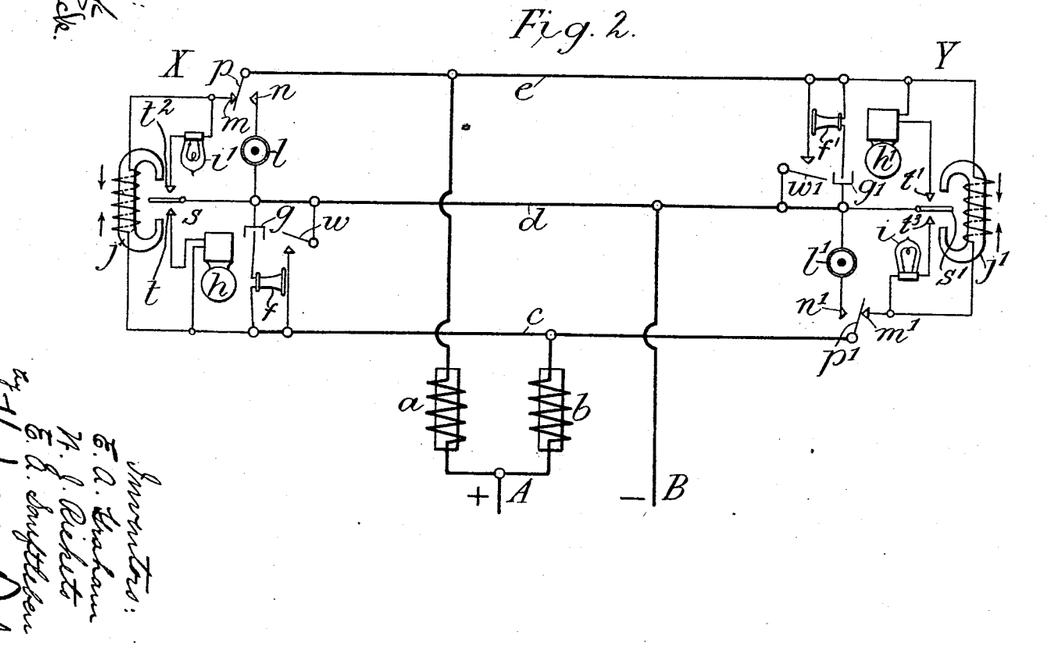

Referring now to the arrangement shown in Fig. 2. Here two polarized relays $j$ and $j^1$ are arranged to close contacts associated with separate circuits controlling bells $h$, $h^1$ and signal lamps $i^1$, $i$ respectively when current in one or other direction is received. In other respects Fig. 2 is like Fig. 1. When station X calls station Y by bell signal, push switch $w$ is closed and relay $j^1$ will receive current from line $e$ to line $c$ in the direction as shown by the arrow arranged opposite to the armature $s^1$. The circuit of the bell $h^1$ will then be closed at contact $t^1$ while at the same time the relay $j$ at station X will receive current in the direction of the arrow arranged opposite to the armature $s^2$ and the circuit of the signal lamp $i^1$ will be closed at contact $t^2$. When station X calls station Y by voice in the manner previously described by moving switch arm $p$ to contact $n$ the relay $j^1$ will receive current in the direction of the arrow arranged opposite the armature $s^3$ and the circuit of the signal lamp $i$ will then be closed at contact $t^3$, while the circuit of the relay $j$ at the calling station will be broken at contact $m$. The armatures $s$ and $s^2$ and also $s^1$ and $s^3$ are normally retained in neutral positions, as by springs, and the armatures for each relay are mechanically one. The reverse impulse of current received by such a relay, when, either one of the contacts $t$ or $t^2$, or contacts $t^1$, $t^3$ being in the closed position, the connection at the distant station is broken, serves to break the circuit at such contact and tends to complete the circuit at the other contact of the relay. As however, upon breaking this first contact, no current is supplied to the relay, the armature is consequently brought to rest in the neutral position by the spring. The calls from station Y to station X are similar. Calls by bell or by voice and lamp signal may therefore be selectively given. The push switches $w$ $w^1$ may be in series with a resistance or inductive resistance to facilitate supervision of the distant audible signal as described herein.

Any one of the relays and signals shown in the arrangements of Figs. 1 and 2 may be used throughout, or any combination of the same with any other known kind of audible or visual signals.

Figure 6:
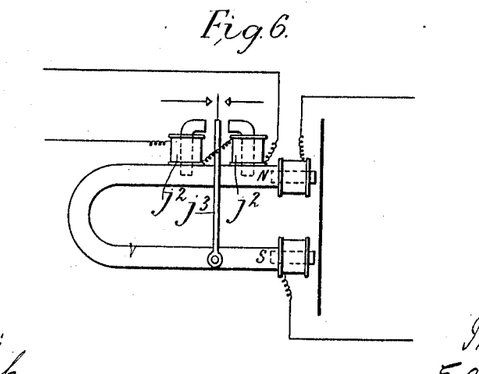
Fig. 6 illustrates in semi-diagrammatic form the polarized relay combined with the permanent magnet of a telephonic receiver.

In Fig. 6, N. S. indicates the permanent magnet of a telephonic receiver used as the polarizing magnet of a relay represented by the coils $j^2$ and polarized tongue $j^3$, such a relay fulfilling the functions of the polarized relays $j$, $j^1$ shown in Fig. 2.

Figure 3:
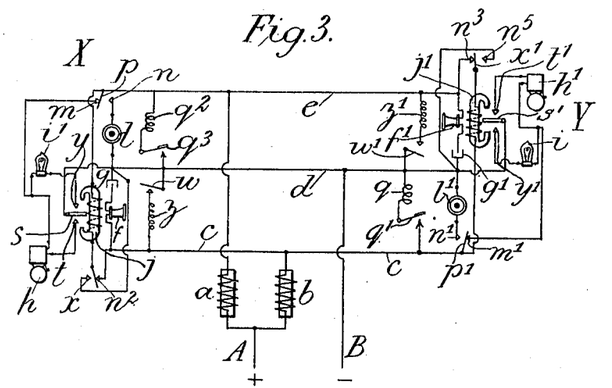

Fig. 3 illustrates another arrangement wherein the energizing winding of the polarized relays serve as the energizing windings of the receiver magnets, $z$ and $z^1$ are resistances in series with the push switches $w$, $w^1$, $q$ is a vibrator interrupter at station Y and $q^1$ is a push switch in series with such vibrator. The arrangement is otherwise similar to Fig. 2. In this case when station X calls station Y by bell signal, push switch $w$ is closed and current flows by one path from the positive supply lead A through the inductance $b$, line $c$, resistance $z$, push switch $w$ to line $d$, and to the negative supply lead B; by another path, through the inductance $a$ line $e$ polarized relay $j$, switch arm $x$, contact $n^2$ resistance $z$, push switch $w$, to line $d$ and negative supply lead B and by a third path through inductance $a$, line $e$, contact $n^3$, switch arm $x^1$, polarized relay $j^1$ to line $c$ through resistance $z$ and push switch $w$, to line $d$ and negative supply lead B. As the polarized relay $j^1$ at the called station Y receives current in the direction of the arrow shown opposite to the armature $s^1$ it operates this armature to close the local circuit of the bell $h^1$, thus giving an audible signal. The bell $h^1$, will receive current from the line $e$ through relay $j^1$, switch arm $p^1$ contacts $m^1$ and $t^1$, armature $s^1$ to line $d$ and negative supply lead B, the bell thus taking current in parallel with the resistance $z$. The resistance $z$ may be inductive and serves to permit current to be supplied to the bell $h^1$ and also to facilitate overhearing in the receiver $f$ at the calling station of the disturbance on the line due to the functioning of the bell. A supervisory signal is thus obtained at the calling station when calling a distant station by means of an audible signal. Further, upon originating a call at station X as described, the polarized relay $j$ receives current in the direction of the arrow shown opposite the armature $s^2$, thus closing the local circuit of the signal lamp $i^1$ through switch arm $p$, contacts $m$ and $y$ and armature $s^2$ to line $d$ and negative supply lead B. In this case, the signal lamp $i^1$ obtains current in parallel with the relay $j$, the resistance $z$ being in series with these devices. When station X calls station Y by voice, switch arm $p$ is moved away from contact at $m$ and makes contact at $n$ and simultaneously switch arm $x$ is moved away from contact $n^2$ and caused to bear against contact $n^4$. Current then flows by one path from the positive supply lead A through inductance $a$ to line $e$, through transmitter $l$ to line $d$ and negative supply lead B; by another path through relay $j$, switch arm $x$, contact $n^4$ to line $d$ and negative supply lead B and by a third path, through inductance $b$ to line $c$ relay $j^1$, switch arm $x^1$, contact $n^3$ to line $e$ transmitter $l$ and line $d$ to negative supply lead B. It will be seen that now the relay $j^1$ at station Y receiving current in the direction of the arrow opposite the armature $s^3$ operates that armature and closes the local circuit through the signal lamp $i$ by way of the switch arm $p^1$ contacts $m^1$ and $y^1$ and the armature $s^3$. A visual signal is thus given together with a voice call at station Y, the telephonic winding of the receiver $f^1$ in series with the condenser $g^1$ being connected in parallel with the transmitter $l$ as previously defined. The winding of the relay $j^1$ serves, as hereinbefore described, as the energizing winding of the magnet of the receiver $f^1$.

It has been shown that the relay $j^1$ is energized to close the circuit of the signal lamp $i$ when a voice call is given, hence the electro-magnet of the receiver $f^1$ is energized and the receiver rendered capable of responding to the fluctuating currents caused by the voice in the transmitter $l$. The relay $j$ at station X is operated in such a sense as would close the circuit of signal lamp $i^1$ but this circuit is broken at contact $m$ as described. The relay $j$ now serves solely as the electromagnet of the receiver $f$, and this receiver is therefore connected in circuit as required at one station when conversation is taking place. Upon receiving the call and signal at station Y the simultaneous operation of switch arms $p^1$ and $x^1$ brings the transmitter $l^1$ and the receiver $f^1$ with its energizing winding into circuit as described above with reference to station X and conversation may then take place without disturbance from any of the signals disposed on the system, the circuit to these signals being now entirely broken. At station Y the vibrator interrupter $q$ shown in series with push switch $q^1$ has such switch arranged to be operated simultaneously with switch arm $x^1$ thereby obviating the possibility of ringing the bell $h^1$ at station Y while giving a vibrator call to station X. When calling by the vibrator $q$, the vibrator is connected in parallel with the distant receiver $f$ in place of the transmitter $l^1$ and functions in a similar manner. It will be seen that the circuit of the signal lamp $i^1$ at station X will be closed and a visual signal thus given with the vibrator call. The magnet of the receiver $f$ is likewise energized as previously described. The circuit of the signal lamp $i$ at station Y is also closed. A vibrator $q^2$ and push switch $q^3$ may be provided at station X and connected in circuit in a similar manner to the vibrator $q$. The circuits for the other calls and signals from station Y to station X may be readily followed from the foregoing description.

Figure 4:
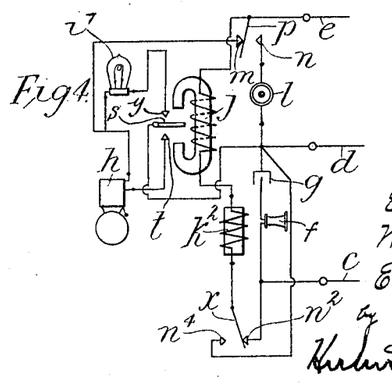
Figure 4A:
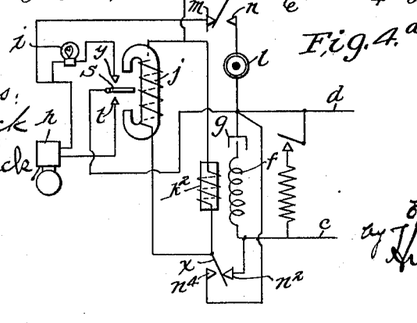

In Fig. 4 $j$ is a polarized relay and $k^2$ a separate electro-magnet for the telephonic receiver $f$. The winding of the electromagnet $k^2$ may be in series, as shown in this figure, or in parallel with the winding of the polarized relay $j$ as shown in Fig. 4ª. The relay and electro-magnet, however, are connected in the circuit in the same manner as previously described with reference to Fig. 3 and function in substantially the same way.

Figure 5:
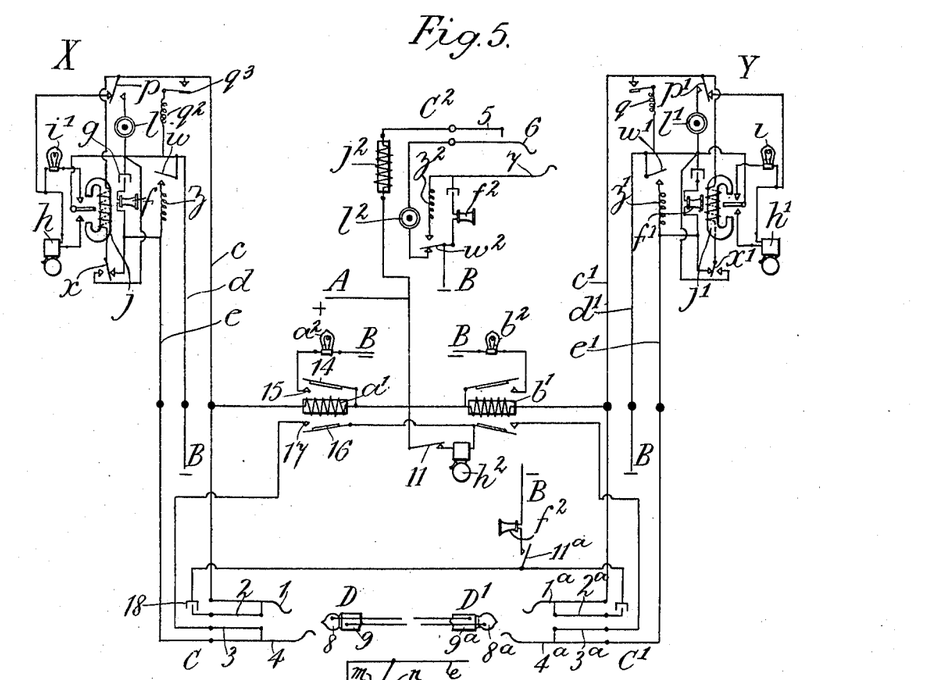
Fig. 5 shows diagrammatically two stations connected to a central exchange switch board.

In Fig. 5 which shows the two stations X and Y connected to a central exchange switch-board, $a^1$ and $b^1$ are inductances serving also as relays; $a^2$ and $b^2$ are individual signal lamps $c$ $c^1$, $d$ $d^1$ and $e$ $e$ are lines connecting stations X and Y to the central exchange switchboard; $w$ $w^1$; $p$ $p^1$ and $x$ $x^1$ are switches as before; $h^2$ is an exchange bell; 1, 2, 3 and 4 and 1ª, 2ª, 3ª and 4ª are the jack springs of two jacks C C¹ corresponding to two out-stations X and Y; 5, 6 and 7 are the jack springs of a jack C² corresponding to the exchange operator's telephonic instrument; 8 8ª are tip contacts and 9, 9ª sleeve contacts respectively of two-way plugs D, D¹; $f^2$ is the exchange calling receiver; $j^2$ is the exchange operator's telephone inductance $q$ and $q^2$ are call vibrators and $w^2$ and 11 and 11ª are switches at the exchange.

The operation of the system is as follows: When station X calls the central exchange switchboard by bell signal, switch $w$ at station X is closed. Current then flows from the positive supply lead A through inductance relay $a^1$ to line $c$ through polarized relay $j$ to switch $x$ and thence through resistance $z$ and switch $w$ to line $d$ and negative supply lead B. The polarized relay $j$ functions as described with reference to Fig. 3 and the circuit of the signal lamp $i^1$ at station X is closed. The inductance relay $a^1$ at the exchange also closes its contacts 14 and 15 and the circuit of the signal lamp $a^2$, individual to station X is thereby closed, identifying the station calling. Also the circuit from the positive supply lead A through the exchange bell $h^2$, contacts 16 and 17 of the inductance relay $a^1$, jack springs 3 and 4, line $e$, resistance $z$, switch $w$ and line $d$ to the negative supply B is closed thereby ringing the said exchange bell. If station X wishes to call exchange by voice or vibrator call, the circuit is such as hereinbefore described for direct working and the change-over switches $p$, and $x$ or the vibrator switch $q^3$ (of Fig. 3 if employed), and change over switch $x$ are actuated. In this case, the exchange receiver $f^2$ takes the place of the distant receiver $f^1$ and is connected to line $c$ in parallel with the transmitter $l$, or vibrator $q^2$, at station X through jack spring 1 and jack spring 2, in series with a condenser 18 as shown, thence through exchange receiver $f^2$ to the negative supply lead B. The inductance relay $a^1$ operates, lighting the individual signal lamp $a^2$ and identifying the station calling as before, but although the contacts 16—17 for closing the exchange bell circuit are made at the relay no current flows through the exchange bell $h^2$ because the line $e$ is now broken at switch $x$ and is not connected to the negative supply lead B at switch $w$. It will be readily understood from Fig. 5 that when the plugs D D¹ are inserted in the jacks C C¹ respectively of the calling station and the station required (for instance in the jacks of stations X and Y), the stations are then connected as shown in Fig. 3, because the insertion of the plugs breaks contact between jack springs 1, 2 and 3, 4 of jack C and between the jack springs 1ª, 2ª and 3ª, 4ª of jack C¹, thus disconnecting the exchange receiver $f^2$ and exchange bell $h^2$ from the lines connecting the stations. The effect of connecting the two jacks C C¹ by means of a pair of plugs D D¹ cross connected as shown, one plug D being inserted in one jack C and the connected plug D¹ in the other jack C¹, is to join jack spring 1 to jack spring $4^a$ and jack spring $1^a$ to jack spring 4. The inductance relay $a^1$ is then connected through line $c$ to the transmitter $l$, of one station say X, and through jack springs 1 and $4^a$ and line $e^1$ to the receiver $f^1$ of the distant station, say Y, the said transmitter and receiver being then connected in parallel. The inductance relay $b^1$ is similarly connected forming the reciprocal talking circuit and the return connections on lines $d$ and $d^1$ are common.

When an out-station, for instance, station X, originates a call or signal to the exchange and the operator at the exchange wishes to communicate with the out-station, one plug say D of a cross connected pair of plugs D, $D^1$ at the exchange is inserted in the jack C of the said out-station and the other plug $D^1$ in the operator's jack $C^2$. The operator's inductance $j^2$ is then connected from the positive supply lead A through jack springs 5 and 6 to the operator's transmitter $l^2$ and thence to the negative supply lead B. The jack spring 6 is also then connected, in a manner such as hereinbefore described, to jack spring 4 of jack C and through line $e$ to the receiver $f$ of the out-station X and thence through the line $d$ to the negative supply lead B. At the same time the operator's jack spring 7 is connected to jack spring 1 of jack C and through line $c$ to switch $p$, transmitter $l$ of station X and line $d$ to the negative supply lead B. The transmitter $l^2$ and receiver $f^2$ of the operator's instrument are then connected to the receiver $f$ and transmitter $l$ respectively of the said out-station X for speech and the operator may speak to the out-station without actuating any further switches. If the operator desires to call the out-station X by bell, plug $D^1$ is inserted in his jack $C^2$ and plug D in jack C, and the change-over switch $w^2$ in the operator's instrument is actuated whereupon current then passes from the positive supply lead A through the inductance $j^2$, jack spring 5 to jack spring 6, through plug contacts $8^a$ and 9 to jack spring 4, line $e$, switch $x$, through the polarized relay $j$ to line $c$, jack spring 1 through the plug contacts 8 and $9^a$ to jack spring 7 and thence through resistance $z^2$ and switch $w^2$ to the negative supply lead B. Current also flows by another path namely through inductance relay $a^1$ to jack spring 1 and thence as just traced to switch $w^2$ and negative supply lead B, thereby causing lamp $a^2$ to glow. These circuits are similar to those described for a like signaling purpose in connection with Fig. 3. It will be seen that under the conditions just mentioned the polarized relay $j$ at station X receives current in such a direction as to close the circuit of the bell $h$ at station X whereby the exchange operator has originated a bell call to the out-station X. By means of a switch 11 provided at the exchange the circuit of the exchange bell $h^2$ can be broken and the switch board be controlled by means of the signal lamps and calling receiver $f^2$ only. Or a switch $11^a$ may be provided to break the circuit of receiver $f^2$ at the exchange whereby the switch board can be operated by means of lamp signals only if so desired.

It will be understood that the exchange system hereinbefore described and shown in Fig. 5 is also applicable to a three wire telephonic system of the kind shown in Figs. 1 and 2.

Figures 7, 9:
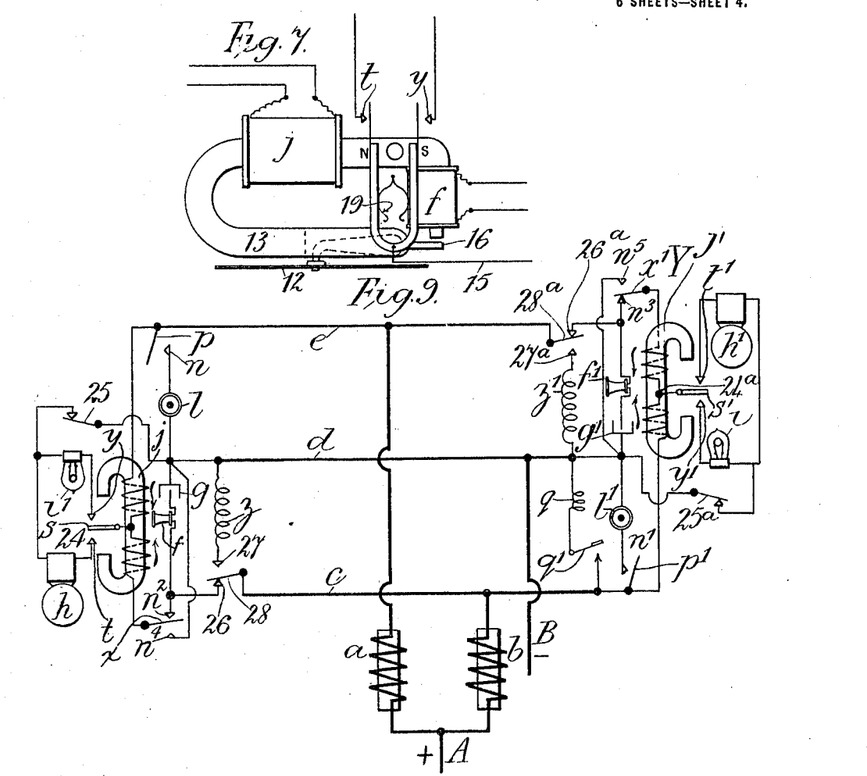
Fig. 7 illustrates a similar combination of the polarized relay with the electromagnet of a receiver.
Figs. 8 and 9 are diagrams of modified arrangements.

Fig. 7 shows a constructional form of polarized relay combined with the electromagnet of a telephonic receiver. N, S are the polar limbs of a permanent magnet forming the movable element of a polarized relay and the two limbs of which correspond to the armatures $s$ $s^2$ of a polarized relay such as relay $j$ shown in Fig. 3, $f$ is the telephonic winding of a receiver; $j$ is the winding of the polarized relay and also the energizing winding of the receiver magnet; 13 is a soft iron core constituting the receiver magnet when energized by the winding $j$; 12 is the receiver diaphragm; $t$ and $y$ are the relay contacts and 15 is a conductor constituting a common junction for connecting the polar limbs N, S that co-act with the said relay contacts $t$ and $y$ to a line wire as $d$ in Figs. 3, 4 and 5. The movable element N, S is held normally in the "off" position shown by any suitable spring device such as 19. When the winding $j$ receives current in one direction the soft iron core 13 is magnetized whereupon the element N S will move to one side in accordance with such magnetization. It will be clear that upon the winding $j$ receiving current in the reverse direction, the core 13 will be oppositely magnetized and the movable element N S will likewise move in an opposite direction. Consequently, the contacts $t$ and $y$ will be alternatively connected to the common junction conductor 15. The telephonic winding $f$ of the receiver is in series with a condenser as described with reference to Fig. 3 and acts upon the lever 16 and diaphragm 12 in the usual telephonic manner irrespective of the direction of magnetization of the core 13. Such a combination of polarized relay and telephonic receiver will fulfil all the functions of the devices of this kind hereinbefore described with reference to and shown in Figs. 3 and 5.

Figure 8:
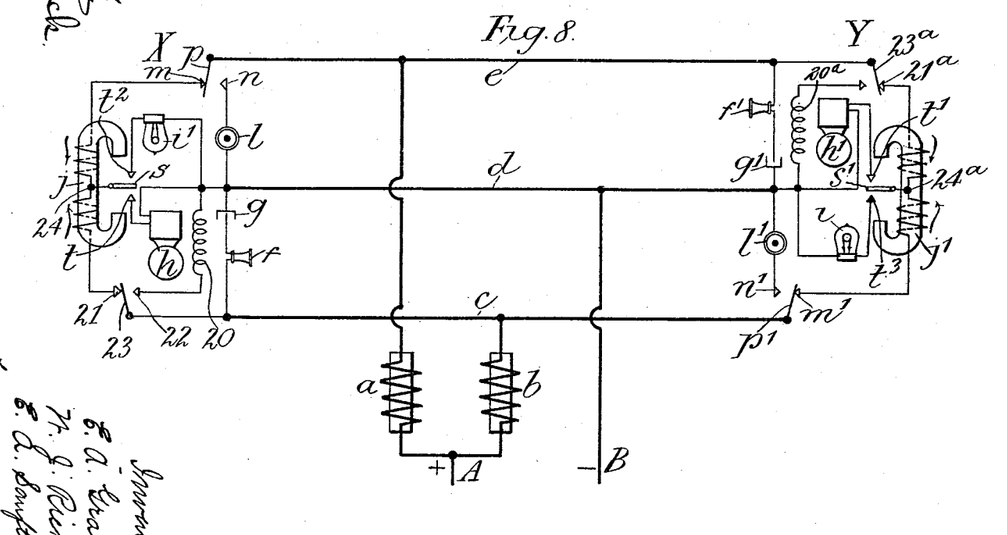

Fig. 8 is a direct modification of Fig. 2 devised so that the functioning of the relays $j$ $j^1$ becomes positive notwithstanding varying differences of potential across the lines $c$ $d$ $e$ consequent upon the closing of local circuits or upon constructive variations in the effective resistances of the elements employed.

In addition to the elements correspondingly lettered in Fig. 2 the arrangement of the said Fig. 8 includes resistances 20, 20$^a$, which may be inductive; 21, 21$^a$ being normal contacts and 22, 22$^a$ alternative contacts of switch arms 23, 23$^a$ respectively. 24, 24$^a$ are middle junction points of the windings of the polarized relays $j$ and $j^1$ to which the armatures $s$, $s^2$ and $s^1$, $s^3$ are respectively connected.

Referring to the said Fig. 8, when station X desires to call station Y, by audible (bell) signal, switch arm 23 is moved from contact 21 to contact 22. Current then flows by one path from the positive supply lead A through inductance $b$ to line $c$, switch arm 23, contact 22, resistance 20 and line $d$ to the negative supply lead B; by another path from the positive supply lead A through inductance $a$ to line $e$, switch arm 23$^a$, contact 21$^a$, polarized relay $j^1$, contact $m^1$ and switch arm $p^1$ to line $c$ and through resistance 20 to the negative supply lead B. The circuit of the relay $j$ is broken at this time at contact 21 whereby the maximum difference of potential between the lines $e$ and $c$ is retained for operating the distant relay $j^1$. The polarized relay $j^1$ receiving current in the direction of the arrow shown opposite to the armature $s^1$, closes the circuit of the bell $h^1$ from the middle point 24$^a$ of the relay windings by way of the armature $s^1$ and contact $t^1$ to the line $d$ and negative supply lead B. It will be seen that the bell $h^1$ obtains current in series with one half of the winding of the relay $j^1$ and in parallel with the other half of the winding which is in series with the resistance 20 at the calling station. If the current for operating the bell were taken direct from the line $e$ to the negative supply lead B, the bell would then be connected through the agency of the relay $j^1$ in parallel with the said relay thereby decreasing the effective voltage across this relay. Now if the relay in any particular case should be working near the lower limit of its range, this decrease of voltage might cause the release of the armature closing the bell circuit and therefore the interruption of such circuit, which would have the effect of at once increasing the voltage across the relay whereupon the bell circuit would be again closed. Consequently, under certain conditions the relay might be liable to chatter, which would prevent a perfect operation of the bell or other signal. On the other hand, if the positive side of the signal circuit closed by the relay, were connected to the negative side of the relay, thus being in series with the relay and in parallel with the resistance at the calling station, the relay would be liable to become locked or held in the "on" position, especially in cases where the current taken to operate the signal has a constant value.

As described, the bell in the example takes current from the middle point 24$^a$ of the relay windings and although the difference of potential between this point and the negative is thereby decreased, yet at the same time, the voltage across the other half of the relay winding is increased and the relay armature therefore firmly retained in position. The current for operating the signal is, as before mentioned, taken through one half of the relay windings but this does not cause the relay to lock "on" because, when the switch arm 23 is released at the calling station and returned from contact 22 to contact 21, the lines $c$ and $e$ will become of equal potential and the signal connected to the negative line $d$ by the relay $j^1$ at the called station would momentarily take current equally from the lines $e$ and $c$ through the inductances $a$ and $b$ and through each half of the windings of the relay $j^1$, but as these windings are now in opposition, the relay will release its armature which will be returned to its normal position by its control spring, thus breaking the circuit of the signal. When station X calls station Y by voice, the switch arm $p$ is moved from contact $m$ to make contact at $n$, whereupon current flows by one path from the positive supply lead A through inductance $a$ to line $e$, switch arm $p$ and transmitter $l$ to line $d$ and to the negative supply lead B and by another path from the positive supply lead A through inductance $b$ to line $c$, switch arm $p^1$, contact $m^1$, polarized relay $j$, contact 21$^a$, switch arm 23$^a$ to line $e$ and thence through transmitter $l$ to the negative supply lead B. The polarized relay $j^1$ now receiving current in the direction of the arrow shown opposite the armature $s^3$, closes the circuit of the signal lamp $i$ from the middle point 24$^a$ of the relay winding by way of the armature $s^3$ and contact $t^3$ to line $d$ and thence to the negative supply lead B. The transmitter $l$ of station X being now connected in parallel with the receiver $f^1$ of station Y, as required for speaking on circuits of the kind referred to, enables a voice call to be given from station X to station Y. At the same time the signal lamp $i$ is lighted at the called station. The signal lamp is connected to the middle point 24$^a$ of the windings of the relay $j^1$ in the manner hereinbefore described with reference to the bell $h^1$, and the sequence of operation will be similar.

The signaling circuits from station Y to station X can be readily followed from the foregoing description.

The polarized relays shown and described enable a voice call with visual signal, or an audible signal, to be selectively given between the stations. Supervision of the audible call is also obtained at the calling station.

In Fig. 9 there is shown a direct modification of Fig. 3 deviced with the same object of obtaining positive action of the relays as described with reference to Fig. 8, 25 and $25^a$ being additional switches and 26, $26^a$ and 27, $27^a$ normal and alternative contacts respectively of switch arms 28, $28^a$.

The action is as follows:—When station X desires to call station Y by audible (bell) signal, switch arm 28 is moved from contact 26 to contact 27. Current then flows by one path from the positive supply lead A through inductance $b$ to line $c$, switch arm 28, resistance $z$ to line $d$ and the negative supply lead B, and by another path from the positive supply lead A through inductance $a$ to line $e$, switch arm $28^a$ contact $26^a$, contact $n^3$, switch arm $x^1$ polarized relay $j^1$ to line $c$ resistance $z$ and line $d$ to the negative supply lead B. The circuit of the relay $j$ is broken at this time at contact 26, whereby the maximum difference of potential between the lines $e$ and $c$ is retained for operating the distant relay $j^1$. The polarized relay $j^1$ receiving current in the direction of the arrow shown opposite to the armature $s^1$ closes the circuit of the bell $h^1$ from the middle point $24^a$ of the relay windings by way of the armature $s^1$, contact $t^1$ and switch $25^a$, to the line $d$ and negative supply lead B.

It will be seen that the condition of the circuit is now similar to that described for the like operation with reference to Fig. 8 and the functioning is substantially the same.

When station X desires to call station Y by voice, switch 25 and switch arms $p$ and $x$ are simultaneously operated so that switch arm $p$ makes contact at $n$ and switch arm $x$ breaks contact at $n^2$ and makes contact at $n^4$ while the circuit through switch 25 is broken. Current now flows by one path from the positive supply lead A through inductance $a$ to line $e$ and through transmitter $l$ and polarized relay $j$ in parallel by way of switch arm $p$ and contact $n$ and switch arm $x$ and contact $n^4$ respectively to line $d$ and the negative supply lead B, and by another path from the positive supply lead A through inductance $b$ to line $c$, polarized relay $j^1$, switch arm $x^1$ contact $n^3$, contact $26^a$, switch arm $28^a$ to line $e$, transmitter $l$ to line $d$ and the negative supply lead B. The polarized relay $j^1$ receiving current now in the direction of the arrow shown opposite the armature $s^3$, closes the circuit of the signal lamp $i$ from the middle point $24^a$ of the windings of relay $j^1$ by way of the armature $s^3$, contact $y^1$ and push switch $25^a$ to line $d$ and the negative supply lead B. The transmitter $l$ of station X is then connected to the receiver $f^1$ of station Y, as required for speaking on circuits of the kind referred to, the winding of the polarized relay $j^1$, which is the energizing winding of the electromagnet of receiver $f^1$ has current flowing through it and a voice call can, therefore, now be given from station X to station Y. At the same time, the signal lamp $i$ is as above stated, lighted at the called station. The signal lamp is connected to the middle point $24^a$ of the windings of the relay $j^1$ in the manner previously described and the sequence of operation is similar. The polarized relay $j$ at the calling station is energized (as is also, therefore, the electromagnet of the receiver $f$) and tends to close the circuit of the signal lamp $i^1$ but the circuit of this lamp is broken at switch 25 as described. The vibrator interrupter $q$ is shown as disposed at station Y and the circuit of the same may be closed at push switch $q^1$ simultaneously with the operation of push switch $25^a$ and switch arm $x^1$. In this manner, a vibrator interrupter call may be given at station X together with a lamp signal, the circuits being similar to those traced for a voice call with lamp signal from station X to station Y. Such a vibrator interrupter may be provided at each station. The remaining signaling circuit from station Y to station X can be readily followed from the foregoing description.

What we claim is:—

1. A telephone system of the kind described comprising transmitters and receivers at two stations, three wires connecting together such instruments, of which wires two are normally at the same potential, relay arrangements connected across such wires of the same potential, indicating means associated with the relays and switch mechanism adapted to lower the potential of one of the normally equipotential wires in relation to the other, and thereby to permit of voice calls by transmitter and calls by the indicating means to be selectively given.

2. A telephone system of the kind described comprising transmitters and receivers at two stations, three wires connecting together such instruments, inductance coils individually connecting two of such wires to one pole of a source of supply so that normally they are of the same potential, relay arrangements connected across such wires of the same potential, indicating means associated with the relays and switch mechanism adapted to lower the potential of one of the normally equipotential wires in relation to the other, and thereby to permit of voice calls by transmitter and calls by the indicating means to be selectively given.

3. A telephone system of the kind described comprising transmitters and receivers at two stations, three wires connecting together such instruments, of which wires two are normally at the same potential, relays connected across such wires of the same potential and having armatures movable only in response to current in one direction, indicating means, local circuits for such indicating means adapted to be closed by the relay armatures and fed from the telephone system when thus closed and switch mechanism adapted to lower the potential of one of the normally equipotential wires in relation to the other to alter the circuit conditions of each relay.

4. A telephone system of the kind described comprising transmitters and receivers at two stations, three wires connecting together such instruments, inductance coils individually connecting two of such wires to one pole of a source of supply so that normally they are of the same potential, relays connected across such wires of the same potential and having armatures movable only in response to current in one direction, indicating means, local circuits for such indicating means adapted to be closed by the relay armatures and fed from the telephone system when thus closed and switch mechanism adapted to lower the potential of one of the normally equipotential wires in relation to the other to alter the circuit conditions of each relay.

5. A telephone system of the kind described comprising transmitters and receivers at two stations, three wires connecting together such instruments, of which wires two are normally at the same potential and connected to one pole of a source of supply, electromagnetic windings at each station connected across such wires of the same potential, receiver windings and magnetizable cores whereon such receiver windings are arranged, adapted to be influenced by the electromagnetic windings aforesaid, relay armatures associated with the magnetizable cores and responsive to the said electromagnetic windings, indicating means, local circuits for such indicating means adapted to be closed by the relay armatures and to be then fed from the telephone system and switch mechanism adapted to effect connection between one of the equipotential wires across which the electromagnetic windings referred to are connected, and the third wire during conversation, thereby lowering the potential of such normally equipotential wire and securing relay operations.

6. A telephone system of the kind described comprising transmitters and receivers at two stations, three wires connecting together such instruments, inductance coils individually connecting two of such wires to one pole of a source of supply so that normally they are of the same potential, electromagnetic windings at each station connected across such wires of the same potential, receiver windings and magnetizable cores whereon such receiver windings are arranged, adapted to be influenced by the electromagnetic windings aforesaid, relay armatures associated with the magnetizable cores and responsive to the said electromagnetic windings, indicating means, local circuits for such indicating means adapted to be closed by the relay armatures and to be then fed from the telephone system and switch mechanism adapted to effect connection between one of the equipotential wires, across which the electromagnetic windings referred to are connected, and the third wire during conversation, thereby lowering the potential of such normally equipotential wire and securing relay operations.

7. In a telephone system of the kind described, the combination with the transmitters and receivers at two stations and the three wires connecting them together, of windings which in part form electromagnets for the receivers and in part form relays, indicating means influenced by the relays and switch mechanism connecting the windings across the wires between the stations of the system so as to take current only when the latter is in actual use.

8. In a telephone system of the kind described, the combination with the transmitters and receivers at two stations and the three wires connecting them together, of a polarized relay at each station, indicating means and a local circuit therefor adapted to be closed with operation of the relay upon the passage of current in one direction, indicating means and a local circuit therefor adapted to be closed with operation of the relay upon the passage of current in the opposite direction and switch mechanism adapted to connect each relay across the system in different ways.

9. In a telephone system of the kind described, the combination with the transmitters and receivers at two stations and the three wires connecting them together of a polarized relay at each station, indicating means and a local circuit therefor adapted to be closed by operation of the relay upon the passage of current in one direction, indicating means and a local circuit therefor adapted to be closed by operation of the relay upon the passage of current in the opposite direction, an allied receiver magnet, electromagnetic windings influencing the relay and the said receiver magnet and switch mechanism adapted to interrupt and complete the circuit of the windings at one end thereof.

10. In a telephone system of the kind described, the combination with the transmitters and receivers at two stations and the three wires connecting them together, of a polarized relay at each station, indicating means and a local circuit therefor adapted to be closed by operation of the relay upon the passage of current in one direction, indicating means and a local circuit therefor adapted to be closed by operation of the relay upon the passage of current in the opposite direction, windings forming part of electromagnets for the receivers and part of the polarized relays and switch mechanism connecting the windings across the wires between the stations of the system so as to take current only when the latter is in actual use.

11. In a telephone system of the kind described, the combination with the transmitters and receivers at two stations and the three wires connecting them together, of a polarized relay at each station, an energizing winding for each such relay, local circuits leading from a mid point of such winding and adapted to be alternatively closed by the relay, indicating means included in the local circuits and switch mechanism adapted to connect each relay across the system in different ways.

12. In a telephone system of the kind described, the combination with the transmitters and receivers at two stations and the three wires connecting them together, of a polarized relay at each station, an energizing winding for each such relay, local circuits leading from a mid point of such winding and adapted to be alternatively closed by the relay, indicating means included in the local circuits and switch mechanism adapted to connect each relay across the system in different ways, the two half windings of the relay temporarily acting to oppose each other if a local circuit remain closed when the switch mechanism has been operated to return the system to normal condition.

13. In a telephone system of the kind described, the combination with a receiver diaphragm, of a magnetizable core associated with such diaphragm, receiver windings on such core, a pair of contacts, a polarized element pivoted to the core so as to be influenced by the latter and adapted to be moved into engagement with either contact, yielding means normally holding such polarized element out of engagement with the contacts and an energizing winding associated with the core and adapted to produce reversal in movement of the polarized element, the whole forming a combination telephone receiver and relay having a core common to each.

14. In a telephone system of the kind described, the combination with a receiver diaphragm, of a magnetizable core associated with such diaphragm, receiver windings on such core, a pair of contacts, a polarized element pivoted between its polar extremities to one end portion of the core and having each such polar extremity adapted to engage a corresponding contact of the pair aforesaid, yielding means normally holding such polarized element out of engagement with the contacts and a winding adapted to energize the core and produce reversals in its polarity so as to produce reversals in the movement of the polarized element the whole forming a combination telephone receiver and relay having a core common to each.

Signed at Brockley this nineteenth day of May, 1914.

EDWARD ALFRED GRAHAM.
   WILLIAM JOHN RICKETS.
   ERNEST ALBERT SANFTLEBEN.

Witnesses:
 EDMUND EUGENE BARNARD,
 HENRY WILLIAM DIMORE.

Copies of this patent may be obtained for five cents each, by addressing the "Commissioner of Patents. Washington, D. C."